United States Patent Office 3,565,593
Patented Feb. 23, 1971

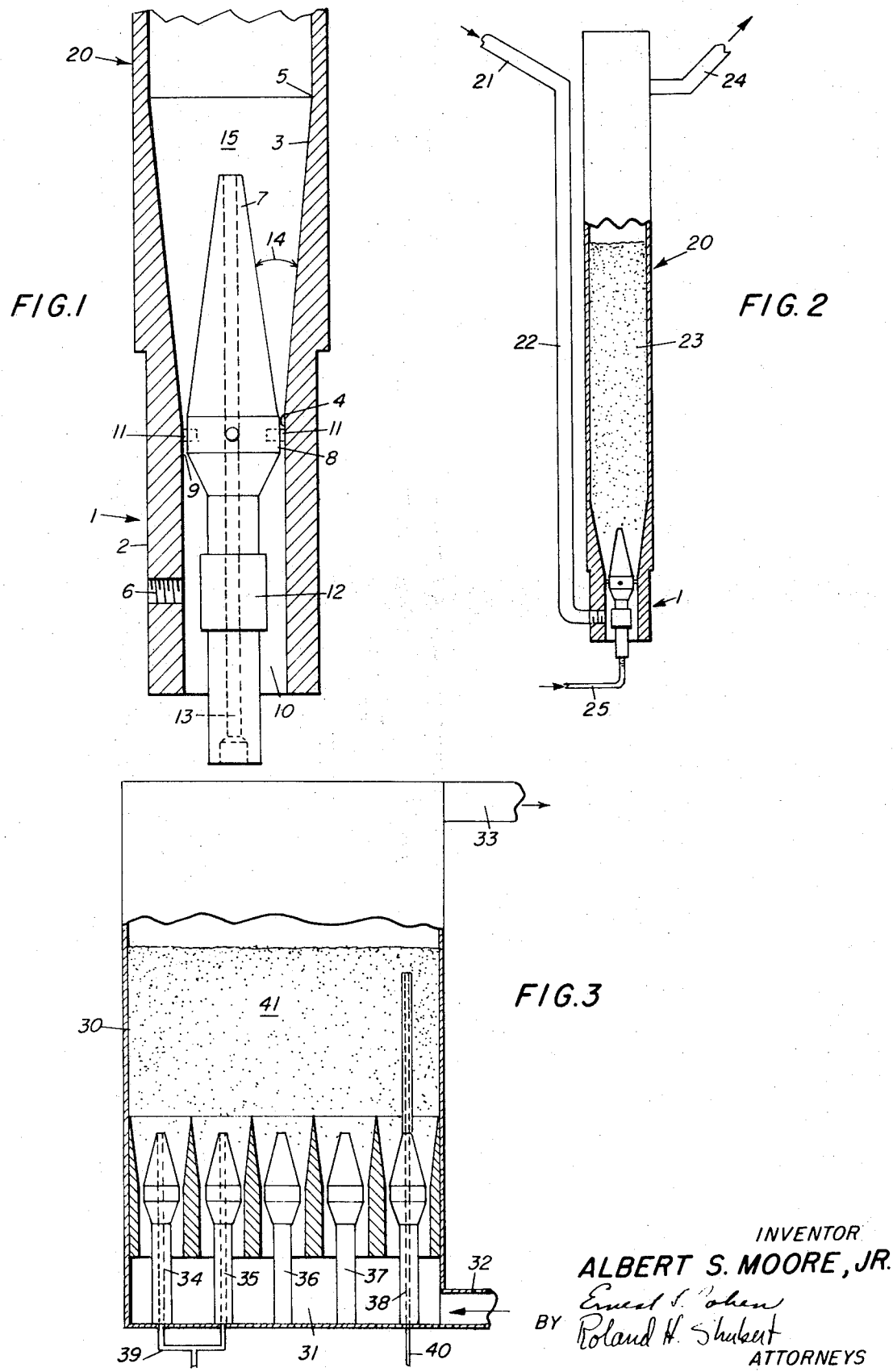

3,565,593
CONVERGING-DIVERGING TYPE GAS-SOLIDS
FLUIDIZER AND METHOD OF USE
Albert S. Moore, Jr., Morgantown, W. Va., assignor to the United States of America as represented by the Secretary of the Interior
Filed Oct. 14, 1968, Ser. No. 767,366
Int. Cl. B01j 9/18; C10j 3/46; F27b 15/00
U.S. Cl. 48—73
14 Claims

ABSTRACT OF THE DISCLOSURE

A converging-diverging nozzle type gas distributor for a fluidized bed reactor provides great flexibility in the control of fluidizing gas flow and is particularly applicable to high temperature processing and reaction of solids.

---

This invention resulted from work done by the Bureau of Mines of the Department of the Interior, and the domestic title to the invention is in the Government.

BACKGROUND OF THE INVENTION

Gas-solids fluidized bed contactors find use in an extremely wide variety of processes including drying of solids, catalytic reactions, coal gasification, ore treatment and combustion reactions. Generally speaking, any process involving the contacting of a gas with a particulate solid is a candidate for this type of handling.

One major disadvantage of the conventional fluidized bed reactor is that the velocity of the fluidizing gas must be closely coordinated with the properties of the particulate solids to insure stable fluidization. Fluidizing gas flow cannot be increased substantially above design capacity without encountering channeling or slugging of the bed. If gas velocity is decreased substantially below design velocity, the bed tends to collapse and particulate material tends to pass through the grid plate distributor into the fluidizing gas plenum creating severe erosion of the grid plate. Thus, control flexibility of the fluidized bed reactor is generally quite restricted in comparison to a fixed bed reactor which allows considerable variation of the gas space velocity.

It has long been recognized that the design of the gas inlet device can drastically affect fluidization performance. Gas bubbles are often present in fluidized beds under most operating conditions. These bubbles, although decreasing the efficiency of the process, usually do not get big enough to cause slugging behavior until high gas velocities are reached. This is especially true in large diameter reactors.

For example, in fluid catalytic cracking regenerators, measurements of oxygen concentration within the bed often show lower concentrations than in the gas leaving the bed. This indicates that bubbles or streams of gas pass through the bed without significant contact or reaction with the particles making up the bed. Such data also implies that there is a very inefficient transfer of kinetic energy from the fluidizing gas to the bed with a considerable amount of fluidizing gas passing through the bed at high velocity without contributing to the fluidizing effect.

The most practical approach so far in overcoming this problem has been to improve the distribution of gases entering the bed. Attempts to break up gas bubbles by the use of intermediate grids within the bed have generally been found to be ineffective. Gas inlet devices conventionally used include multi-orifice plates of many varieties, screens, porous plates and grids.

SUMMARY OF THE INVENTION

It has been found that gas distributing means for a fluidized bed consisting of one or more converging-diverging type nozzles having annular orifices provide significant advantages over the bed supporting and gas distributing means conventionally used. Little or no solids erosion of the gas distributor occurs because the bed is effectively supported on a cushion of gas. Fluidization may be maintained over an extremely wide range of gas flows thus providing a high degree of flexibility in the control of the process. Solids may be conveniently introduced into and removed from the bed by means of conduits located in an axial position relative to the annular orifices.

Thus, it is an object of this invention to provide improved gas distributing means for a fluidized bed processing vessel.

Another object of this invention is to provide means for introducing and removing particulate material from a fluidized bed.

A further object of this invention is to provide a process for contacting fluidizable solids with gases which provides a large range of gas flow while maintaining the bed in a state of stable fluidization.

DETAILED DESCRIPTION OF THE INVENTION

The invention will be more clearly understood from the following description of a preferred embodiment wherein reference is made to the accompanying drawings.

FIG. 1 is a cross-sectional view of the gas distributing means of the invention.

FIG. 2 is a sectional view of a processing vessel particularly adapted for use in high temperature reactions of solids with gases.

FIG. 3 illustrates three different embodiments of the gas distributing means as used in a large processing vessel.

Turning now to FIG. 1, the numeral 1, indicates generally the gas distributor of this invention. It comprises a body portion or housing 2 having an internal axial bore 3, shaped to form a throat which has a minor diameter at 4, a downstream end at 5 and an upstream gas entry port at 6. Axially disposed within body portion 2 is internal member 7 which cooperates with body portion 2 to form a converging-diverging, or venturi-type nozzle. The upper part of member 7 tapers in a downstream direction with the greatest diameter 8 of member 7, being aligned with the smallest diameter of body member 2, thus forming a symmetrical open annular area 9 between the two components. A relatively large annular gas distribution area 10 communicates with gas entry port 6 at the upstream portion of the assembly.

It is preferred that the internal axial bore 3 of body portion 2 be of frusto-conical internal section tapering regularly upward. Likewise, it is preferred that the upper portion of member 7 form a regular, upward, conical taper. Annular space 9 must remain substantially uniform in area throughout its circumference to insure uniform gas distribution and optimum operating results. Body portion 2 and member 7 are rigidly mounted to a common base (not shown) to prevent relative movement of the components. In order to insure proper alignment during severe or high temperature use, spacing pegs 11, preferably 3 in number, may also be provided. It has also been found desirable in extreme temperature use to provide a temperature and erosion resistant collar 12, opposite gas entry port 6, to protect member 7 from excessive wear.

In a preferred embodiment of the nozzle assembly, internal member 7 is provided with an open bore 13 extending axially through the length of the member. Included angle 14, formed by the diverging taper of body portion 2 and member 7, varies between about 5 to 25° depending upon the application, and is preferably in the range of about 10 to 15°. In opeartion the distributor forms the base of a fluidized bed reactor. Fludizing gas enters the distributor through gas entry port 6, passes through annular space 9 at a sufficient velocity to suspend the largest and densest particle present in the fluidized bed, and slows to fluidizing velocity in the general area denoted by numeral 15. Solids may be introduced into the fluidized bed as a pneumatic suspension through bore 13.

Referring now to FIG. 2, there is shown a single gas distributor used in conjunction with a fluidized bed. The assembly comprises a generally cylindrical reactor vessel 20 having mounted at the base thereof gas distributor means 1. Fluidizing gas 21 from any convenient source, is conveyed via conduit 22 to the gas entry port of distributor 1. This gas passes upwardly through the venturi-type nozzle of distributor 1 and maintains particulate bed 23 in a fluidized condition. Gas exits from the reactor by way of conduit 24. Particulate solids may be added to the reactor vessel by passing them in pneumatic suspension through conduit 25 and upwardly through the axial bore of the gas distributor.

Although the gas distributor means may be made in virtually any size, practical considerations limit its diameter to the range of a few inches to a few feet. A rather limited ratio of bed height to bed diameter thus results from the use of a single distributor. This limitation can be undesirable in some large-scale uses such as in catalyst regeneration, catalytic reactions of various types and fluidized bed coking. In these cases, a multiple-distributor reactor, such as that illustrated in FIG. 3, may be used.

The multiple-distributor reactor comprises a reaction vessel 30 of any convenient size and shape. Fluidizing gas enters distributor plenum 31 via port 32 and exits by way of conduit 33. A plurality of gas distribution nozzles, such as that shown in FIG. 1, are mounted in the base of the reactor. These embodiments of the gas distributor means are illustrated. Distributors 34 and 35 correspond to that illustrated in FIG. 1 and may be used to introduce pneumatically suspended solids into the reactor via conduit 39. Distributors 36 and 37 function only to distribute fluidizing gas into the reactor. An axially-bored gas distributor may be extended to form a standpipe terminating at any desired level within the fluidized bed 41 as is illustrated by distributor 38. Solids may then be removed from the bed downwardly through the gas distributor and passed out of the reactor via line 40. Any one distributor type or any combination of types may be used in a single reactor depending upon the circumstances. For example, all three types may be used to advantage in a catalyst regenerator wherein catalyst is continuously added and removed from the reaction zone while the types illustrated by elements 37 and 38 might be used to advantage in a fluidized coking process.

The following examples illustrate specific embodiments and uses of the gas distributor means in a fluidized bed reactor.

EXAMPLE 1

A reactor similar to that illustrated in FIG. 2 was used for heat and mass transfer studies of the C+H₂O reaction at elevated temperatures and pressures. The angle (angle 14 of FIG. 1) formed by the diverging taper of the body portion and the internal member of the gas distributor was 13°. Diameter of the reactor was 4 inches. Coal was reacted with superheated steam at temperatures up to 2000° F. and pressures as high as 100 p.s.i. A fluidized bed having an expanded height of about 16 to 22 inches was maintained in the reactor over a range of fluidizing gas flow varying by a factor of 10. Pulverized coal pneumatically entrained in steam was introduced into the reactor through the axial bore of the gas distributor.

EXAMPLE 2

A fluidized bed reactor, generally corresponding to that illustrated in FIG. 2, was constructed of transparent materials for a visual study of the mechanics of fluidization. Numerous tests showed that fluidizing gas flow could be varied at will over an extremely wide range without disruption of the fluidized bed. Minimum gas flow required to prevent bed collapse was found to be about ⅛ design velocity while maximum gas flow which could be tolerated without slugging was found to be about 6 times design velocity. Effectively then, the fluidizing gas flow could be varied by a factor of approximately 50.

These examples illustrate the extreme operating versatility provided by the gas distribution means of this invention. In the coal-steam reaction, illustrated in Example 1, the coal introduction method was easily controlled and operated without problem. Previous conventional methods of solids introduction has been found unsatisfactory under the conditions of temperature and pressure encountered in the reaction. Screw feeders, for example, delivering solids to the top of the bed, are totally inoperable at these temperatures. Since cocurrent flow of reactants is highly desirable in this reaction, use of a quick-release valve to dump solids into the top of the reactor is precluded since coal would react first with product gas rather than with steam. Little or no wear was observed on the gas distributor as perhaps could be predicted since effectively no solids erosion of the distributor parts can occur.

What is claimed is:

1. Apparatus for contacting gases and fluidizable solids which comprises a vertically disposed vessel, outlet means in the upper portion thereof for removing gases and gas distributing means in the lower portion of the vessel, said gas distributing means comprising at least one converging-diverging nozzle, said nozzle comprising an outer body member having an open bore extending axially therethrough, said bore diverging outwardly in the upper portion thereof, an inner member axially disposed within said outer body member, said inner member converging upwardly and downwardly from a major diameter thereof, the major diameter of said member being smaller than a minor diameter of said outer body member, the two members being secured in a fixed relationship such that the major diameter of the inner member is in substantial alignment with a minor diameter of the outer member so as to form a converging-diverging annular orifice.

2. The apparatus of claim 1 wherein the angle formed between the diverging upper portion of the outer body member and the converging upper portion of the inner member is in the range of 5 to 25°.

3. The apparatus of claim 2 wherein the inner member is provided with solids introduction means, said introduction means comprising an open bore extending axially through said inner member thereby providing a conduit for the introduction of a pneumatically suspended solids stream into the vessel.

4. The apparatus of claim 2 wherein a plurality of spacing members are provided between the inner and outer members to maintain the annular space between those members substantially uniform in area throughout its circumference.

5. The apparatus of claim 2 wherein the diverging upper portion of the outer body member and the converging upper portion of the inner member comprise a regular conical taper.

6. The apparatus of claim 2 wherein the inner member is extended upwardly to form a standpipe having an open bore extending axially therethrough and terminating within an upper portion of a bed of fluidized solids maintained within said vessel.

7. The apparatus of claim 2 wherein a plurality of gas distributing means are provided.

8. The apparatus of claim 2 wherein the angle formed between the diverging upper portion of the outer body member and the converging upper portion of the inner member is in the range of 10 to 15°.

9. A process for contacting gases and fluidizable solids which comprises introducing a fluidizing gas upwardly into a vessel containing a bed of fluidizable solids through at least one converging-diverging nozzle, said nozzle comprising an outer body member having an open bore extending axially therethrough, said bore diverging outwardly in the upper portion thereof, an inner member axially disposed within said outer body member, said inner member converging upwardly and downwardly from a major diameter thereof, the major diameter of said inner member being smaller than a minor diameter of said outer body member, the two members being secured in a fixed relationship such that the major diameter of the inner member is in substantial alignment with a minor diameter of the outer member so as to form a converging-diverging annular orifice, and maintaining the gas velocity through the annular orifice at a velocity greater than the settling velocity of any particle making up the bed whereby the gas velocity is regularly decreased above the annular orifice to a terminal velocity which provides stable bed fluidization and whereby the bed is supported on a cushion of gas and is fluidized by said gas.

10. The process of claim 9 wherein particulate solids are pneumatically introduced into the bed by way of an open bore extending axially through the inner member.

11. The process of claim 9 wherein particulate solids are removed from the bed in a stream by way of an open bore extending axially through the inner member, said inner member being extended upwardly to form a standpipe terminating within an upper portion of the bed.

12. The process of claim 10 wherein the particulate solids comprise carbonaceous material and wherein the fluidizing gas comprises steam.

13. The process of claim 12 wherein said steam is at a temperature in the range of 1400 to 2000° F. and said carbonaceous material comprises coal whereby the coal reacts with the steam and is thereby gasified.

14. The process of claim 9 wherein fluidizing gas is introduced into the vessel through a plurality of converging-diverging nozzles and wherein particulate solids are pneumatically introduced into the bed by way of an open bore extending axially through the inner member of at least one of said nozzles.

References Cited
UNITED STATES PATENTS

| | | | |
|---|---|---|---|
| 2,357,901 | 9/1944 | Lewis et al. | 23—288.35X |
| 2,510,444 | 6/1950 | Watson | 23—288.35 |
| 2,607,662 | 8/1952 | Huff | 23—288.35 |
| 3,052,990 | 9/1962 | Tailor | 34—57A |
| 3,277,582 | 10/1966 | Munro et al. | 23—288.35X |
| 3,459,655 | 8/1969 | Kimberlin, Jr., et al. | 208—127X |

JOSEPH SCOVRONEK, Primary Examiner

U.S. Cl. X.R.

23—1, 284, 288; 34—57; 48—99, 202; 75—26; 208—127; 239—423